United States Patent
Kiuchi et al.

(10) Patent No.: US 6,517,644 B2
(45) Date of Patent: Feb. 11, 2003

(54) ROLLING BEARING AND METHOD MANUFACTURING THE SAME

(75) Inventors: Akihiro Kiuchi, Kanagawa (JP); Hiromichi Takemura, Kanagawa (JP); Yasuo Murakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/735,523

(22) Filed: Dec. 14, 2000

(65) Prior Publication Data

US 2001/0015244 A1 Aug. 23, 2001

(30) Foreign Application Priority Data

Dec. 14, 1999 (JP) ............................................. 11-355119

(51) Int. Cl.⁷ ............................ C21D 9/40; C22C 38/18; C22C 38/12; C22C 38/22; C22C 38/24
(52) U.S. Cl. ...................... 148/333; 148/906; 148/589; 148/334; 148/335; 148/328; 148/320; 492/912
(58) Field of Search ................... 148/906, 589, 148/332, 328, 333, 334, 335, 320; 384/492, 912

(56) References Cited

U.S. PATENT DOCUMENTS 4,191,599 A * 3/1980 Stickels et al. ............. 148/906
5,352,303 A    10/1994 Murakami et al.
5,672,014 A     9/1997 Okita et al.

FOREIGN PATENT DOCUMENTS

| DE | 677015 C | 5/1939 | |
|---|---|---|---|
| DE | 197 33 101 C2 | 2/1998 | |
| JP | 62-218542 | 9/1987 | ........... C22C/38/06 |
| JP | 4-28845 | 1/1992 | ........... C22C/38/00 |
| JP | 7-72565 | 3/1995 | ........... G03B/42/02 |

OTHER PUBLICATIONS

Patent Abstracts of Japan, Adachi Shiyuugorou et al., Publication No. 06293939, Oct. 21, 1994.

* cited by examiner

*Primary Examiner*—Deborah Yee
(74) *Attorney, Agent, or Firm*—Sughrue Mion, PLLC

(57) ABSTRACT

An outer ring 2 as a stationary ring is fabricated with a steel material having the composition as shown under. The steel material contains, as alloying elements, C 0.80 to 1.10 wt %, Si 0.20 to 0.50 wt %, Mn 0.2 to 1.0 wt %. It also contains any two kinds or more of Cr, Mo and V at rates of Cr: 1.2 to 3.5 wt %, Mo: 0.5 to 1.5 wt % and V: 0.2 to 1.0 wt %. The containing rates of Cr, Mo and V satisfy the under mentioned formula (1). It further contains Ti and/or Cu at rates of Ti: 0.05 to 0.20 wt % and Cu: 0.2 to 2.0 wt %

$$1.8 \leq [Cr] \times 0.6 + [Mo] \times 0.5 + [V] \leq 3.0 \qquad (1).$$

Accordingly, it is possible to remarkably lengthen the life of a rolling bearing such as a bearing for alternator to be used under high vibration and high load.

10 Claims, 2 Drawing Sheets

CE: COMPARATIVE EXAMPLES
E: EXAMPLES

ROLLING BEARING AND METHOD MANUFACTURING THE SAME

BACKGROUND OF THE INVENTION

The invention relates to a rolling bearing, in particular a rolling bearing suitable for engine auxiliary machines (alternator, electromagnetic clutch or intermediate pulley), and also relates to a method for manufacturing the same.

Conventionally, SUJ2 (high carbon chromium bearing steel—2nd category) has mainly been employed as materials of bearing rings and rolling elements of rolling bearings.

Recently, in company with making automobiles small sized and light weight, auxiliary machines of engines have also been demanded to provide high performance and high output together with making the small size and the light weight. For example, bearings for alternators are subjected to high vibration or high load (around 4 G to 20 G at the acceleration of gravity) through belts accompanying rotation of high speed simultaneously with working of the engine. Therefore, in the conventional bearing for the alternator, a problem has been present that exfoliation (so called as a premature peeling) is easy to occur at an premature period of service especially in the bearing face of the outer ring being a stationary ring.

There have been proposed many techniques for preventing the premature peeling/exfoliation so as to lengthen the life of the bearing to be served under the high vibration and high load.

For example, Japanese Patent Unexamined Publication No. Hei.4-28845 proposes the use of a steel containing low carbon (C) (0.65 to 0.90%) and high chromium (Cr) (2.0 to 5.0%) in comparison with SUJ2 which has hitherto been used. This publication discusses that the premature exfoliation is caused by generation of a white structure in steel which occurs by cohesion of carbon. Thus, by employing the above mentioned steel, the carbon is prevented from diffusion to be a cause of cohesion for attaining the long life.

Japanese Patent Unexamined Publication No. Sho.62-218542 proposes the technology that a blank material is made by adding Al or Si to SUJ2 or a steel following it to be 1 to 2% therein, a bearing ring is formed with this blank material, followed by an ordinary quenching and a tempering at high temperature, thereby decreasing a residual austenite to be 8 vol % or lower. According to this art, a softening resistance by tempering is heightened by adding Al or Si. By decreasing the residual austenite, it is possible to reduce a plastic deformation in the bearing face under the high vibration and high load. Thereby, the hardness in the bearing ring is maintained high to prevent the premature exfoliation for attaining the long life.

Further, Japanese Patent Examined Publication No. Hei.7-72565 discloses that the stationary ring formed with SUJ2 is carried out with the ordinary quenching and then a subzero treatment, followed by the high temperature tempering, for reducing the residual austenite to be 10 vol % or lower in the stationary ring. That is, by reducing the residual austenite in the stationary ring, the hardness in the bearing ring is maintained high to lower the plastic deformation in the bearing face of the stationary ring under the high vibration and high load to reduce the premature exfoliation.

However, the circumstances of using rolling bearing for engine auxiliary machines have recently been severer. Therefore, a problem has arisen that the technology set forth in JP-A-4-28845 could not sufficiently check the appearance of the white structure.

A further problem is that since the arts of Japanese Patent Examined Publication No. Hei.7-72565 and Japanese Patent Unexamined Publication No. Sho.62-218542 reduce the residual austenite by the tempering of high temperature, the hardness over the entire bearing ring is lowered accordingly. If the blank material is a steel of high Al or Si as 1 to 2%, oxides based inclusions are easily formed and a rolling fatigue life is probably shortened.

SUMMARY OF THE INVENTION

The invention has been realized, paying attentions to the problems of the prior arts, and accordingly it is an object of the invention to provide a rolling bearing served under the conditions of high vibration and high load, in which the premature exfoliation is prevented and a long life of the bearing is possible, and also to provide a method for manufacturing the same.

For accomplishing the above mentioned problems, the rolling bearing of the invention is characterized in that at least the stationary ring (the bearing ring of an inner ring and an outer ring, which is at a stationary side when using) is fabricated with a steel material containing as alloying elements carbon (C) 0.80 to 1.10 wt %, silicon (Si) 0.20 to 0.50 wt %, manganese (Mn) 0.2 to 1.0 wt %, and further containing any two kinds or more of chromium (Cr), molybdenum (Mo) and vanadium (V) at rates of Cr: 1.2 to 3.5 wt %, Mo: 0.5 to 1.5 wt % and V: 0.2 to 1.0 wt %, the containing rates of Cr, Mo and V satisfying the under mentioned formula (1), subsequently subjecting to the quenching and the tempering.

$$1.8 \leq [Cr] \times 0.6 + [Mo] \times 0.5 + [V] \leq 3.0 \tag{1}$$

(in the formula, [Cr] shows the containing rate (wt %) of Cr in the steel material, [Mo] shows the containing rate (wt %) of Mo in the steel material, and [V] shows the containing rate (wt %) of V in the steel material).

The above-mentioned object can also be achieved by a rolling bearing according to the present invention comprising:

a stationary ring;

a rotating ring; and a plurality of rolling elements disposed between the stationary ring and the rotating ring, wherein the stationary ring is made of a steel material containing, 0.80 to 1.10% by weight of C, 0.20 to 0.50% by weight of Si, 0.20 to 1.0% by weight of Mn, and further containing any two kinds or more of 1.2 to 3.5% by weight of Cr, 0.5 to 1.5% by weight of Mo, and 0.2 to 1.0% by weight of V wt %, and wherein containing rates of Cr, Mo and V satisfying a following formula (1), $$1.8 \leq [Cr] \times 0.6 + [Mo] \times 0.5 + [V] \leq 3.0 \tag{1}$$

where, [Cr] defines the containing rate (wt %) of Cr in the steel material, [Mo] indicates the containing rate (wt %) of Mo in the steel material, and [V] denotes the containing rate (wt %) of V in the steel material, wherein the steel material is subsequently subjected to quenching and tempering.

In addition to this, the above-mentioned object can further be achieved by a method for manufacturing a component of rolling bearing comprising a stationary ring, a rotating ring and a plurality of rolling elements disposed between the stationary ring and the rotating ring, the method according to the present invention comprising:

forming a blank stationary ring with a steel material containing, as alloying elements 0.80 to 1.10% by weight of C,
0.20 to 0.50% by weight of Si, and
0.20 to 1.0% by weight of Mn, and further containing any two kinds or more of 1.2 to 3.5% by weight of Cr,
0.5 to 1.5% by weight of Mo, and
0.2 to 1.0% by weight of V wt %, and wherein containing rates of Cr, Mo and V satisfying a following formula (1), $$1.8 \leq [Cr] \times 0.6 + [Mo] \times 0.5 + [V] \leq 3.0 \quad (1)$$

where, [Cr] defines the containing rate (wt %) of Cr in the steel material, [Mo] indicates the containing rate (wt %) of Mo in the steel material, and [V] denotes the containing rate (wt %) of V in the steel material;

quenching thus formed blank stationary ring;
tempering thus quenched blank stationary ring, to thereby provide the stationary ring.

In the rolling bearing of the invention, as the steel material for fabricating at least the stationary ring, the material contains any two kinds or more of Cr, Mo and V at the above mentioned rates such that the above formula (1) is satisfied. Thereby, lots of carbides different in kinds and sizes are diffused and precipitated in the steel after the heat treatment (quenching and tempering). These carbides check the diffusion of carbon, so that the appearance of the white structure is prevented or delayed. Thus, an effect of avoiding the premature exfoliation is heightened, and the life of the bearing used under the high vibration and high load is lengthened.

Specifically, if the steel material to be used contains any two kinds or more of Cr, Mo and V, carbides such as M2C, M3C, M7C3 or M23C6 are diffused and precipitated in the steel after the heat treatment. In the V addition, fine VC and V3C are precipitated, in the Mo addition, spherical Mo2C or bar like Mo23C6 are precipitated, and in the Cr addition, cementite typed Cr3C is precipitated.

These carbides check the diffusion of carbon and have high effects to make difficult to cause dislocation, and therefore their inclusions may lengthen the life of the bearing. Among Cr, Mo and V, the V addition generating fine carbides has the highest effect, next is Cr, and Mo follows.

Herein, if $[Cr] \times 0.6 + [Mo] \times 0.5 + [V]$ of the (1) formula (this is provisionally called as "α value") is determined to be 1.8 or higher to 3.0 or lower, it is found that the existing rates in steel of plural kinds of precipitated carbides are reasonable values for providing effects checking the carbon diffusion.

If the α value is less than 1.8, the effect checking the carbon diffusion is not fully displayed. If the α value is more than 3.0, macro-carbides lowering the bearing life is easily formed. In addition, there is much carbon forming carbides by combining Cr, Mo and V, so that carbon amount made solid in a matrix is short, and it is difficult to provide an enough hardness of the matrix.

In the rolling bearing of the invention, it is desirable that the steel material further contains titanium (Ti) and/or copper (Cu) at the rates of Ti: 0.05 to 0.20 wt % and Cu: 0.2 to 2.0 wt %.

If the steel material contains Ti and/or Cu at the rates of Ti: 0.05 to 0.20 wt % and Cu: 0.2 to 2.0 wt %, there appears precipitation of $Fe_3C$ including TiC precipitation and/or Cu grains in the steel after the heating treatment. These TiC and Cu grains are effective to check the carbon diffusion.

Critical significance for limiting the numerical value as to the containing rate of each element is as follows.

[C: 0.80 to 1.10 wt %]

C is an element made solid in the matrix to impart the hardness to steel, and combining carbide formers such as Cr, Mo and V to form carbides. If the C containing amount is less than 0.80 wt %, the carbon amount made solid in the matrix is short, the hardness demanded to the rolling bearing (57 or more in the Rockwell hardness (HRC) in a case of a scale C) might not be secured. If exceeding 1.10 wt %, macro-carbides are easily generated during steel making, and the fatigue life or the impact resistance are probably decreased.

[Si: 0.20 to 0.50 wt %]

Si is an element acting as a deoxidizer during steel making, and improving a quenching property as well as strengthening martensite of the matrix, and effective for lengthening the bearing life. If the Si containing amount is less than 0.20 wt %, these effects cannot be enough obtained. If exceeding 0.50wt %, machinability, forging property and cold working property are remarkably decreased.

[Mn: 0.2 to 1.0 wt %]

Mn is an element strengthening ferrite in steel and increasing the quenching property. If the Mn containing amount is less than 0.20 wt %, these effects are insufficient. If exceeding 1.0 wt %, an amount of the residual austenite after quenching is much to lower the hardness and the cold working property.

[Cr: 1.2 to 3.5 wt %]

Cr is an element exhibiting improvements of the quenching property, of the softening resistance by quenching and of the abrasion resistance. Further this is an element forming carbides to exhibit the above mentioned effects. If the Cr containing amount is less than 1.2 wt %, these effects cannot be substantially provided. If exceeding 3.5 wt %, not only these effects are saturated, but also macro-carbides are generated and the machinability is deteriorated.

[V: 0.2 to 1.0 wt %]

V is an element forming fine carbides and effective to increase the abrasion resistance. Further, this is an element forming carbides to exhibit the above mentioned effects. If the V containing amount is less than 0.2 wt %, these effects cannot be substantially provided. If exceeding 1.0 wt %, not only these effects are saturated, but also macro-carbides are generated and cost-up of materials arises.

[Ti: 0.05 to 0.20 wt %]

Ti is an element forming carbides and exhibiting the effect to check the carbon diffusion. If the Ti containing amount is less than 0.05 wt %, this effect cannot substantially be provided. If exceeding 0.20 wt %, this effect is saturated.

[Cu: 0.2 to 2.0 wt %]

Cu improves a corrosion resistance of steel, and precipitates as Cu grains as mentioned above. The Cu grain has the effect checking the carbon diffusion as having referred to. If the Cu containing amount is less than 0.2 wt %, this effect cannot substantiallybe provided. If exceeding 2.0 wt %, not only this effect is saturated, but also the hot working property is worsened.

If the Cu containing amount is much, flaws probably appear in the steel surface during hot-working. For avoiding this, it is preferable to add nickel (Ni) 2.0 wt % or lower (the containing amount in the whole of steel) in response to the Cu containing amount.

DETAILED DESCRIPTION OF THE PREFERRED EMBODIMENTS

Further reference will be made to the mode for carrying out the invention by way of practical Examples and Comparative Examples.

Figure 1:
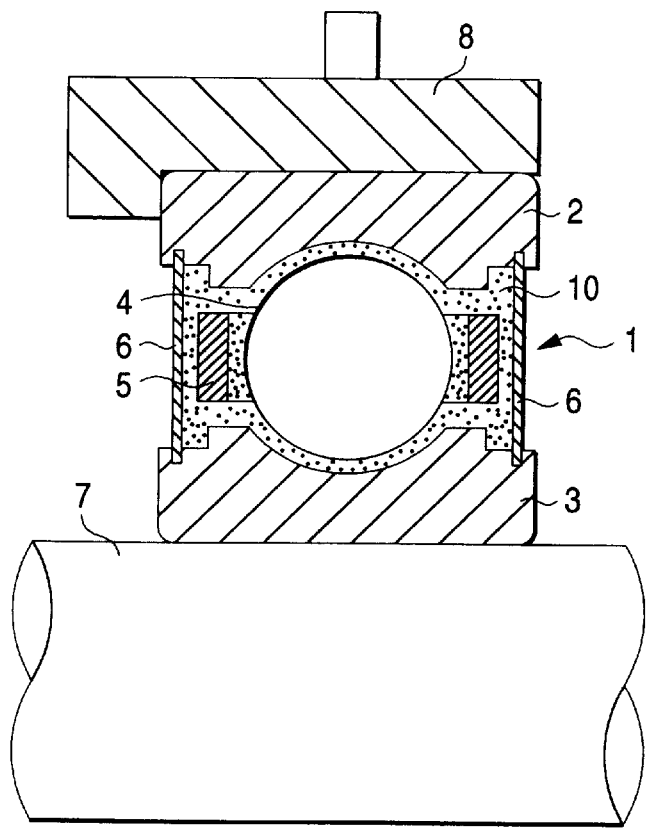
FIG. 1 shows an elevation view showing the rolling bearing corresponding to one embodiment of the invention.

FIG. 1is a cross sectional view showing a rolling-bearing corresponding to one embodiment of the invention.

This rolling bearing 1 is a deep groove ball bearing of JIS bearing No.6303, and an outer ring 2 is a stationary ring secured to a housing 8, while an inner ring 3 is a rotary ring mounted outside on a shaft 7. Between the outer ring 2 and the inner ring 3 there are disposed many rolling elements held by a holder 5, and sealing members 6, 6 are furnished between the outer ring 2 and the inner ring 3 at both sides of the holder 5.

A space surrounded by the sealing members 6, 6 is contained as a grease with GREASE E (the same as E Grease contained in the bearing for alternator described at the 1st paragraph to the 14th paragraph of "SAE Technical Paper: SAE950944 (taking place Feb. 27 to Mar. 2, 1995)").

In the rolling bearing 1, the inner ring 3 rotates together with rotation of the shaft 7, and vibration-load by this rotation act on a loading zone of the outer ring 2 via the inner ring 3 and the rolling elements 4 from the shaft 7

Figure 2:
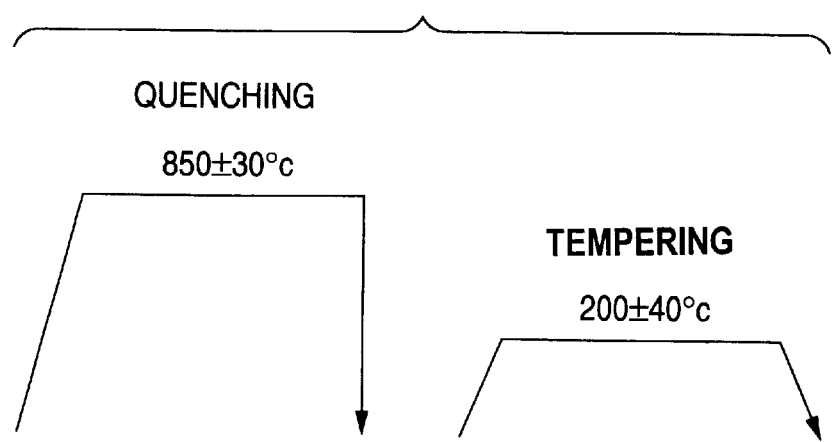
FIG. 2 shows views representing the heat treating conditions carried out to the inner rings and the outer rings in the embodiment.

Herein, the outer ring 2 was formed in a predetermined shape with the steel material of the composition shown in Table 1, followed by the quenching and the tempering under the heat treating conditions shown in FIG. 2. The tempering was performed by adjusting the temperature such that the surface hardness would be HRC61 to 63 after the tempering. Thereby, the amount of the residual austenite was 1 to 15 vol %.

The steel used in the Comparative Example 5 is SUJ2. Each of the used steels contains as impurities phosphorus (P), sulphur (S), oxygen (O) other than elements shown in Table 1, and P and S are 0.025 wt % or lower, and O is 15 ppm or lower.

Of both the Examples and the Comparative Examples, the inner ring 3 and the rolling elements 4 were formed with the same high carbon chromium bearing steel—2 category (SUJ2) by carrying out the heating treatment under the same conditions.

Thereby, the amount of the residual austenite was 8 to 12 vol % and the surface hardness was HRC62. The surface roughness of the inner ring 3 and the outer ring 2 was 0.01 to 0.03 μm by Ra, and the surface roughness of the rolling element was 0.003 to 0.010 μm by Ra.

To the thus produced rolling bearings (Examples 1 to 7 and Comparative Examples 1 to 7) distinguishing the outer rings only, the following life tests were made.

A testing machine was the life testing apparatus for the bearings disclosed in Japanese Patent Unexamined Publication No. Hei.9-89724, performing the rapidly adjustable-speed tests which switched rotation number between 9000 rpm and 18000 rpm per each predetermined time (for example, 9 seconds). A bearing space between the rolling bearings 1 was set to be 10 to 15 μm, the loading condition was P (Load)/C (Load-Rating Load)=0.10, and the testing temperature was 75° C. constant.

Under these conditions, the calculated life of the rolling bearing made of the existing SUJ2 (Comparative Example 5) is 1350 hours, and in this embodiment, the testing was stopped at 1000 hours. In the tests, test pieces of Examples 1 to 7 and Comparative Examples 1 to 5 were 10 pieces respectively, and measurings were continued until seizures and delaminations occurred. L10 lives were demanded from results of 10 test pieces. These results are also shown in Table 1. The piece number of bearings having abnormalities (number of delamination) is also shown in Table 1.

The underlined numerical values in Table 1 show those outside of the numerically defining range of the invention. In case neither seizure nor delamination occurred until stopping the tests as to all the 10 test pieces, L10 life was 1000 hours.

TABLE 1

| | | Composition of steels (wt %) | | | | | | | | | | | |
|---|---|---|---|---|---|---|---|---|---|---|---|---|---|
| | | C | Si | Mn | Cr | Mo | V | Cu | Ti | Ni | D | E | F |
| A | 1 | 1.00 | 0.20 | 0.4 | 1.2 | 1.0 | 0.6 | — | — | — | 1.82 | 883 | 3/10 |
| | 2 | 0.80 | 0.50 | 0.5 | 2.8 | 1.5 | — | — | — | — | 2.43 | 905 | 2/10 |
| | 3 | 0.95 | 0.25 | 1.0 | 2.0 | — | 1.0 | — | — | — | 2.20 | 990 | 1/10 |
| | 4 | 1.05 | 0.30 | 0.6 | 2.5 | 0.5 | 0.5 | — | — | — | 2.25 | 1000 | 0/10 |
| | 5 | 1.00 | 0.25 | 0.4 | 3.0 | 1.0 | 0.5 | — | — | — | 2.80 | 940 | 1/10 |
| | 6 | 1.00 | 0.40 | 0.8 | 3.5 | — | 0.2 | — | — | — | 2.30 | 870 | 2/10 |
| | 7 | 0.90 | 0.30 | 0.3 | 3.3 | 1.0 | 0.5 | — | — | — | 3.00 | 965 | 1/10 |
| B | 1 | 1.00 | 0.40 | 0.6 | 4.0 | 1.2 | 0.8 | — | — | — | 3.80 | 680 | 8/10 |
| | 2 | 0.80 | 0.30 | 0.8 | 2.5 | 1.5 | 1.0 | — | — | — | 3.25 | 644 | 8/10 |
| | 3 | 0.80 | 0.25 | 0.2 | 1.1 | 0.5 | 0.5 | — | — | — | 1.41 | 400 | 10/10 |
| | 4 | 0.90 | 0.30 | 0.5 | 0.8 | 0.4 | — | — | — | — | 0.68 | 255 | 10/10 |
| | 5 | 1.00 | 0.25 | 0.4 | 1.5 | — | — | — | — | — | 0.90 | 150 | 10/10 |

Figure 3:
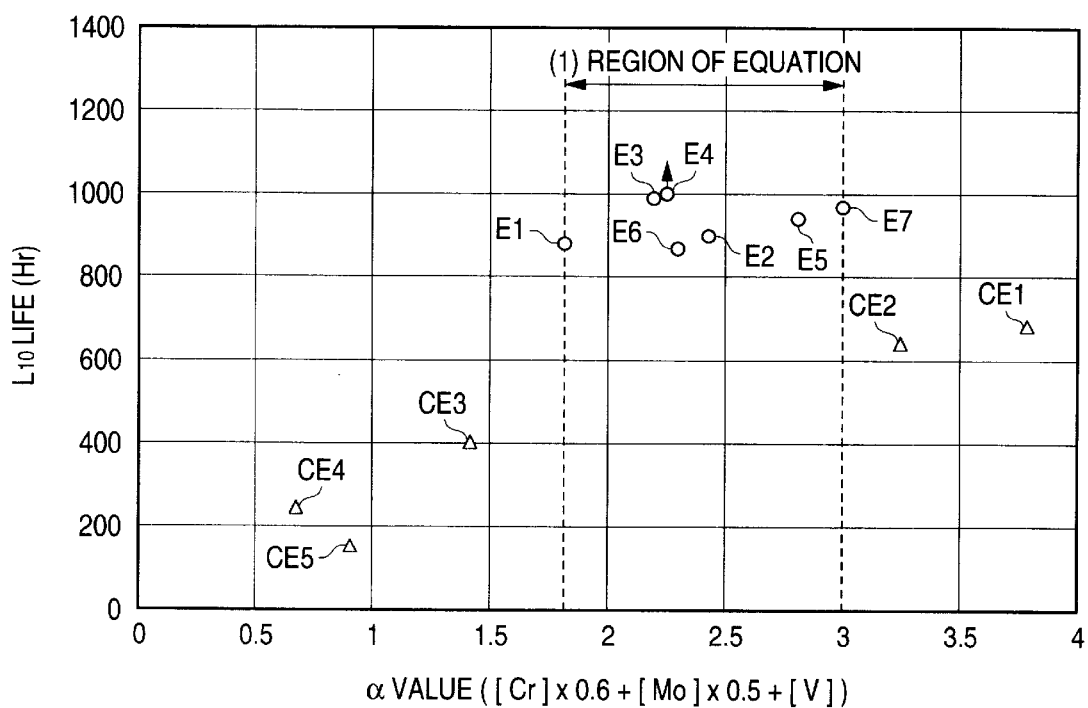
FIG. 3 shows a graph showing the relationship between the α values of the steel materials employed when fabricating the outer rings of Examples and Comparative Examples in the embodiment and the life tested results ($L_{10}$ life) of the bearings of Examples and Comparative Examples.

Note that in the above-mentioned Table 1, A indicates Examples, B denotes Comparative Examples; D defines α value; E denotes L10 Life (time); and F indicates a number of peelings FIG. 3 shows in graph the relationship between the obtained life tested results (L10 life) and the a values of the steels as the outer rings of Examples and Comparative Examples.

As seen from the life tested results, the rolling bearings of Examples 1 to 7 have the compositions of the steel materials fabricating the outer rings satisfying the range of the invention (C, Si, Mn, Cr, Mo, V) and the α values of the steel materials fabricating the outer rings satisfying the (1) formula, and therefore, the lives under the high vibration and high load are considerably lengthened in comparison with Comparative Examples 1 to 5 which do not satisfy these conditions.

In Comparative Examples 1 to 5, delaminations occurred in the loading zone of all the outer rings, and when the delaminated parts were observed by a microscope, it was recognized that structures changed toward to the white structures.

Next, the rolling bearings of Examples 8 to 12 and Comparative Examples 6 to 7 were produced with the steel materials of the outer ring 2 under the same condition as above, excepting that the steel materials have the compositions shown in Table 2. The life tests were made to these rolling bearings in the same manners as mentioned above, provided that the stopping time of the test was 1200 hours. The tested results are shown in Table 2.

TABLE 2

| | | Composition of steels (wt %) | | | | | | | | | | | |
|---|---|---|---|---|---|---|---|---|---|---|---|---|---|
| | | C | Si | Mn | Cr | Mo | V | Cu | Ti | Ni | D | E | F |
| A | 8 | 1.00 | 0.25 | 0.4 | 3.0 | 1.0 | — | 0.4 | — | 1.0 | 2.30 | 1200 | 0/10 |
| | 9 | 0.80 | 0.20 | 0 | 3.3 | 1.4 | — | — | 0.05 | — | 2.68 | 1200 | 0/10 |
| | 10 | 0.95 | 0.25 | 1.0 | 2.5 | 1.0 | 1.0 | — | 0.20 | — | 3.00 | 1200 | 0/10 |
| | 11 | 1.05 | 0.50 | 0.6 | 1.5 | — | 1.0 | 0.2 | — | 0.5 | 1.90 | 1200 | 0/10 |
| | 12 | 1.00 | 0.50 | 0.6 | 3.0 | 1.0 | 0.5 | 1.0 | 0.15 | 1.5 | 2.80 | 1200 | 0/10 |
| B | 6 | 0.80 | 0.30 | 0.4 | 2.0 | 1.0 | 0.5 | — | 0.03 | — | 2.20 | 1050 | 1/10 |
| | 7 | 1.00 | 0.25 | 0.4 | 3.0 | 0.8 | 0.3 | 0.1 | — | 0.2 | 2.50 | 1080 | 1/10 |

Note that in the above-mentioned Table 2, A denotes Examples; B indicates Comparative Examples; D defines α value; E indicates L10 Life (time); and F denotes a number of peelings.

Herein, the rolling bearings of Examples 8 to 12 have the compositions of the steel materials fabricating the outer rings satisfying the range of the invention (C, Si, Mn, Cr, Mo, V, Ti, Cu) and the α values of the steel materials fabricating the outer rings satisfying the (1) formula. Comparative Examples 6 and 7 have the α values satisfying the (1) formula, but the Ti and Cu containing rates are outside of the range of the invention.

As seen from the life tested results and the results shown in Table 1, with respect to the lives under the high vibration and the high load, the life values of the bearings of Comparative Examples 6 and 7 are equivalent or higher than those of Examples 1 to 7 but inferior to those of the bearings of Examples 8 to 12.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As discussed above, according to the invention, by defining the composition of the steel materials forming the stationary rings, it is possible to largely lengthen the lives of the rolling bearings used under the high vibration and the high load.

What is claimed is:

1. A rolling bearing comprising:

a stationary ring;

a rotating ring; and a plurality of rolling elements disposed between said stationary ring and said rotating ring, wherein said stationary ring is made of a steel material containing, 0.80 to 1.10% by weight of C, 0.20 to 0.50% by weight of Si, 0.20 to 1.0% by weight of Mn, and further containing any two kinds or more of 1.2 to 3.5% by weight of Cr, 0.5 to 1.5% by weight of Mo, and 0.2 to 1.0% by weight of V, and wherein the quantities of Cr, Mo and V satisfy a following formula (1), $$1.8 \leq [Cr] \times 0.6 + [Mo] \times 0.5 + [V] \leq 3.0 \tag{1}$$

where, [Cr] defines the quantity (wt %) of Cr in the steel material, [Mo] indicates the quantity (wt %) of Mo in the steel material, and [V] denotes the quantity (wt %) of V in the steel material, wherein said stationary is subsequently subjected to quenching and tempering.

2. The rolling bearing as set forth in claim 1, wherein the steel material contains at least any one kind of 0.05 to 0.2% by weight of Ti;

0.2 to 2.0% by weight of Cu; and 0.5 to 2.0% by weight of Ni.

3. The rolling bearing as set forth in claim 1, wherein a residual austenite in the surface of the stationary ring is 1 to 15 vol %, and a surface hardness thereof is HRC 61 to 63.

4. The rolling bearing as set forth in claim 1, wherein the stationary ring contains carbides of M2C, M3C, M7C3 and M23C6 of any two kinds or more of Cr, Mo and V.

5. The rolling bearing as set forth in claim 1, wherein the stationary ring is one of said inner and outer rings.

6. A method for manufacturing a component of a rolling bearing comprising a stationary ring, a rotating ring and a plurality of rolling elements disposed between said stationary ring and said rotating ring, said method comprising:

forming a blank stationary ring with a steel material containing, as alloying elements 0.80 to 1.10% by weight of C, 0.20 to 0.50% by weight of Si, and 0.20 to 1.0% by weight of Mn, and further containing any two kinds or more of 1.2 to 3.5% by weight of Cr, 0.5 to 1.5% by weight of Mo, and 0.2 to 1.0% by weight of V, and wherein the quantities of Cr, Mo and V satisfy a following formula (1), $$1.8 \leq [Cr] \times 0.6 + [Mo] \times 0.5 + [V] \leq 3.0 \tag{1}$$

where, [Cr] defines the quantity (wt %) of Cr in the steel material, [Mo] indicates the quantity (wt %) of Mo in the steel material, and [V] denotes the quantity (wt %) of V in the steel material;

quenching the thusly formed blank stationary ring;

tempering the quenched blank stationary ring, to thereby provide said stationary ring.

7. The method as set forth in claim 6, wherein the steel material contains at least any one kind of 0.05 to 0.2% by weight of Ti;

0.2 to 2.0% by weight of Cu; and 0.5 to 2.0% by weight of Ni.

8. The method as set forth in claim 6, wherein a residual austenite in the surface of the stationary ring is 1 to 15 vol %, and a surface hardness thereof is HRC 61 to 63.

9. The method as set forth in claim 6, wherein the stationary ring contains carbides of M2C, M3C, M7C3 and M23C6 of any two kinds or more of Cr, Mo and V.

10. The method as set forth in claim 6, wherein the stationary ring is one of said inner and outer rings.

* * * * *